United States Patent [19]

Petrak

[11] 4,396,098

[45] Aug. 2, 1983

[54] FORCE-RESPONSIVE SHOCK ABSORBING APPARATUS

[75] Inventor: Harry A. Petrak, Boulder, Colo.

[73] Assignee: Boulder 12 Investments, Boulder, Colo.

[21] Appl. No.: 231,057

[22] Filed: Feb. 3, 1981

[51] Int. Cl.³ ............................................. F16F 9/19
[52] U.S. Cl. ................................... 188/280; 188/282;
   188/315; 188/318; 188/322.15; 188/322.16;
   188/322.22
[58] Field of Search ............... 188/318, 319, 280, 281,
   188/282, 289, 284–287, 315, 314, 316, 317,
   322.15, 322.13, 322.18, 322.19, 322.16, 322.22;
   267/8 R, 120, 127

[56] References Cited

U.S. PATENT DOCUMENTS

| 860,913 | 7/1907 | Haeberlein | 188/317 |
|---|---|---|---|
| 2,206,110 | 7/1940 | Myers et al. | 188/88 |
| 2,252,771 | 8/1941 | Katcher | 280/90 |
| 2,327,295 | 8/1943 | Whisler, Jr. | 188/280 |
| 2,335,907 | 12/1943 | Boor et al. | 188/88 |
| 2,637,414 | 5/1953 | Patriquin | 188/322.15 |
| 2,916,281 | 12/1959 | Hehn | 267/8 |
| 3,528,531 | 9/1970 | Schweller et al. | 188/317 |
| 3,896,908 | 7/1975 | Petrak | 188/280 |

FOREIGN PATENT DOCUMENTS

| 223497 | 9/1962 | Austria | 188/322.15 |
|---|---|---|---|
| 838403 | 5/1952 | Fed. Rep. of Germany | 188/280 |
| 1083043 | 1/1955 | France | 188/317 |

*Primary Examiner*—Douglas C. Butler
*Attorney, Agent, or Firm*—John E. Reilly

[57] ABSTRACT

A fluid vibration damper, such as, a shock absorber includes a cylinder and piston combination in which the piston head travels through a fluid-filled cylinder and has fluid bypass openings in its external surface forming one or more recesses of predetermined cross-sectional configurations and sizes whereby to regulate fluid flow past the piston head according to a performance curve. The bypass openings can be formed in interchangeable elements so as to permit selective variations in the fluid flow characteristics of each particular size or design of shock absorber according to a specific force performance curve.

23 Claims, 18 Drawing Figures

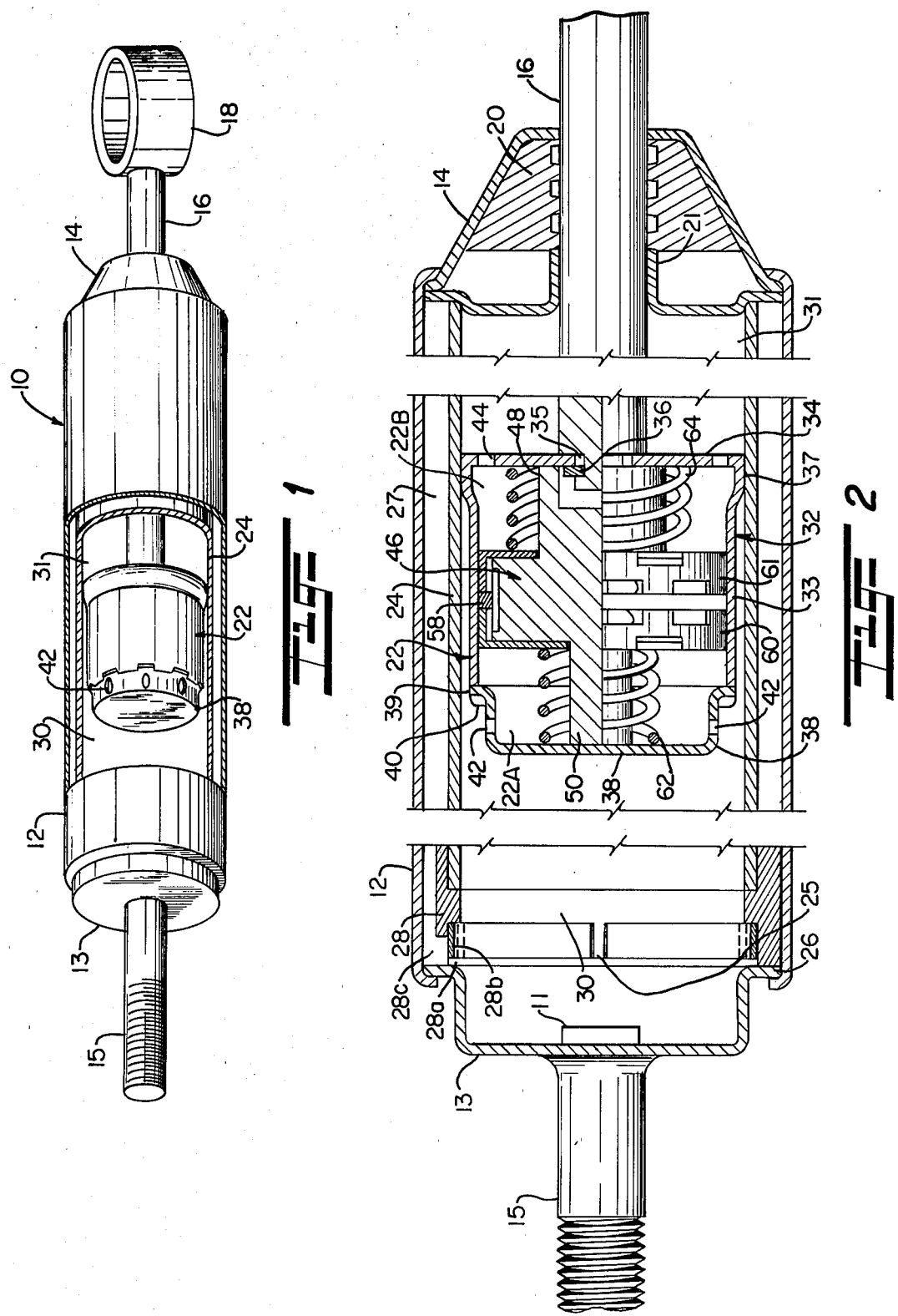

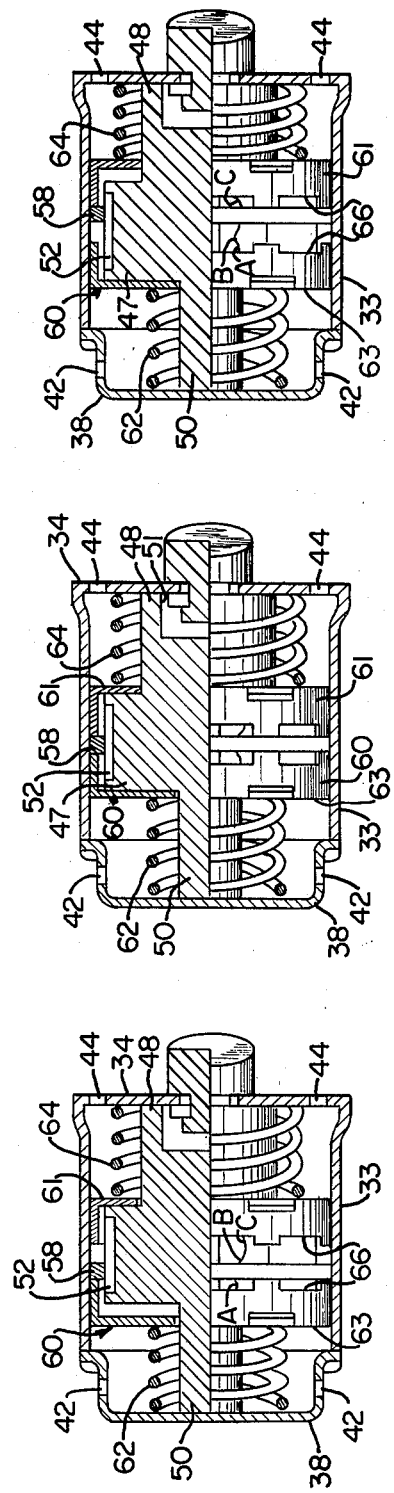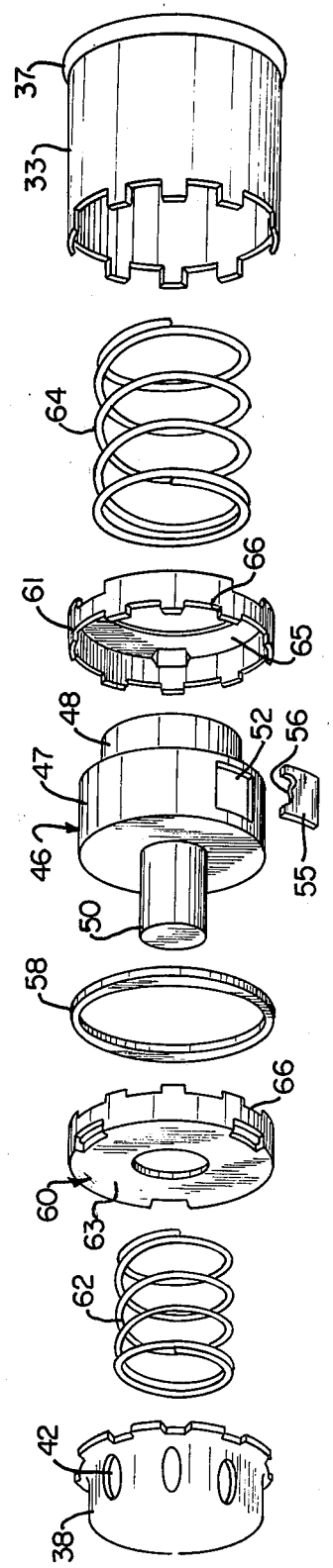

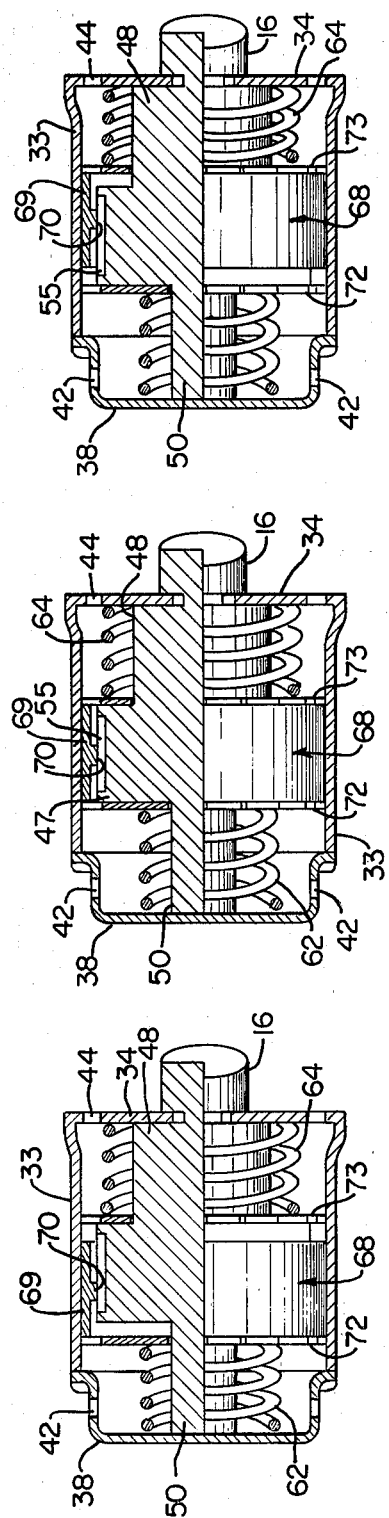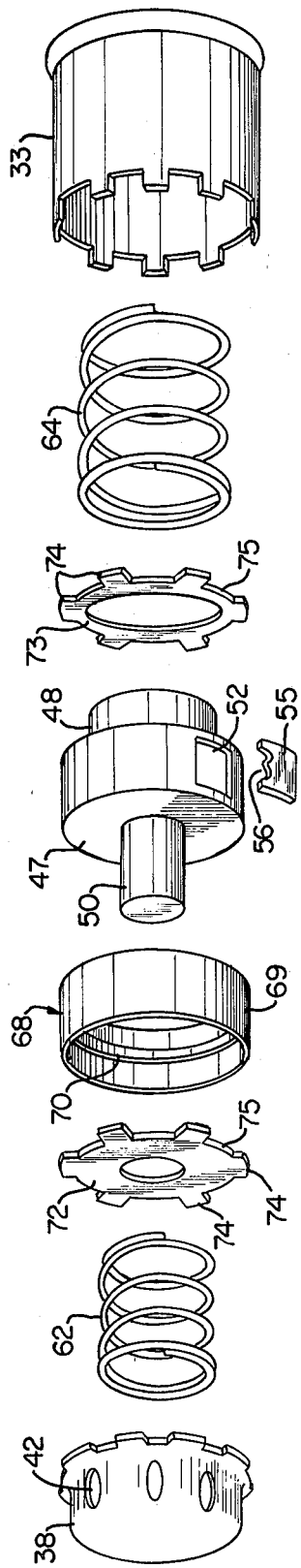

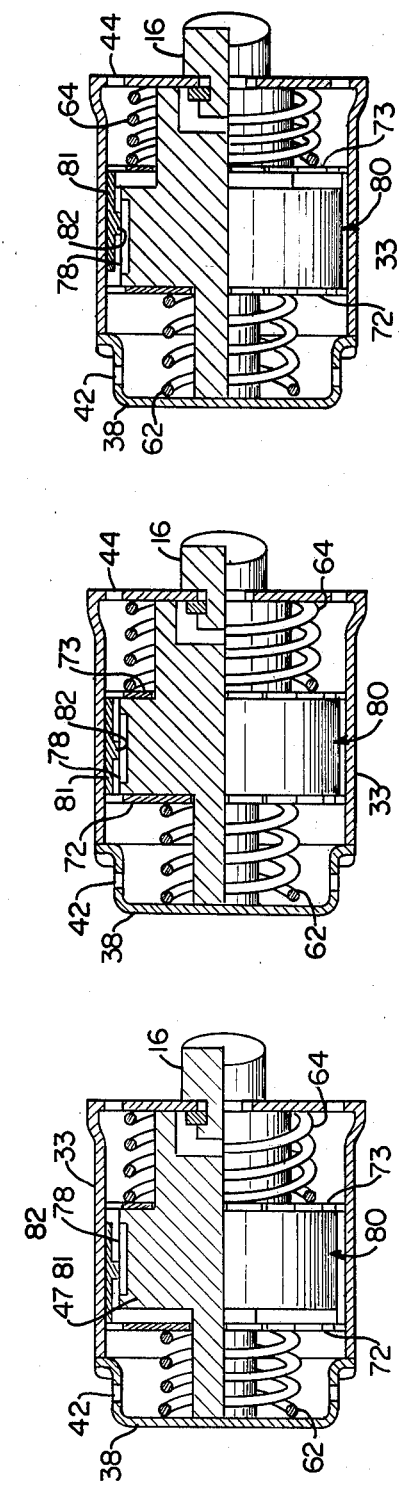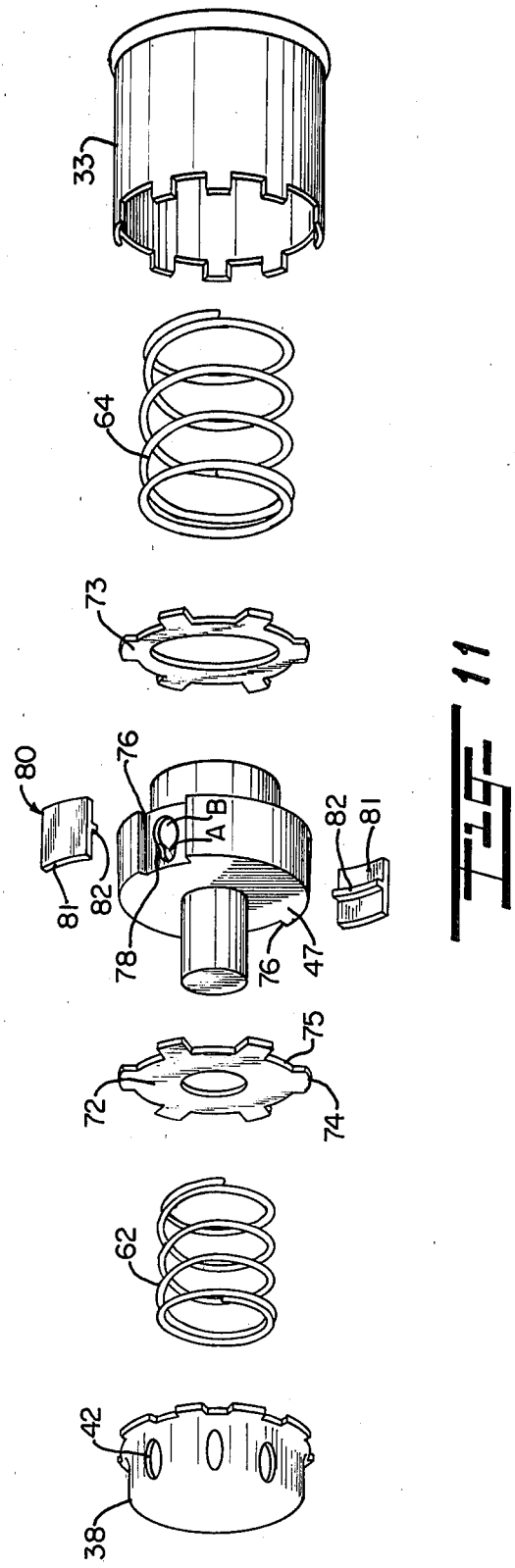

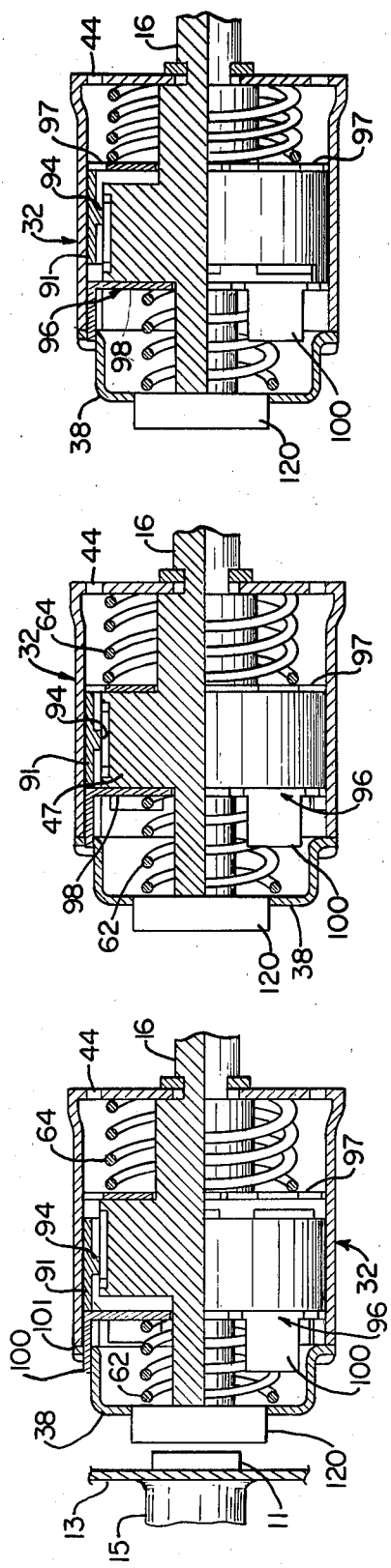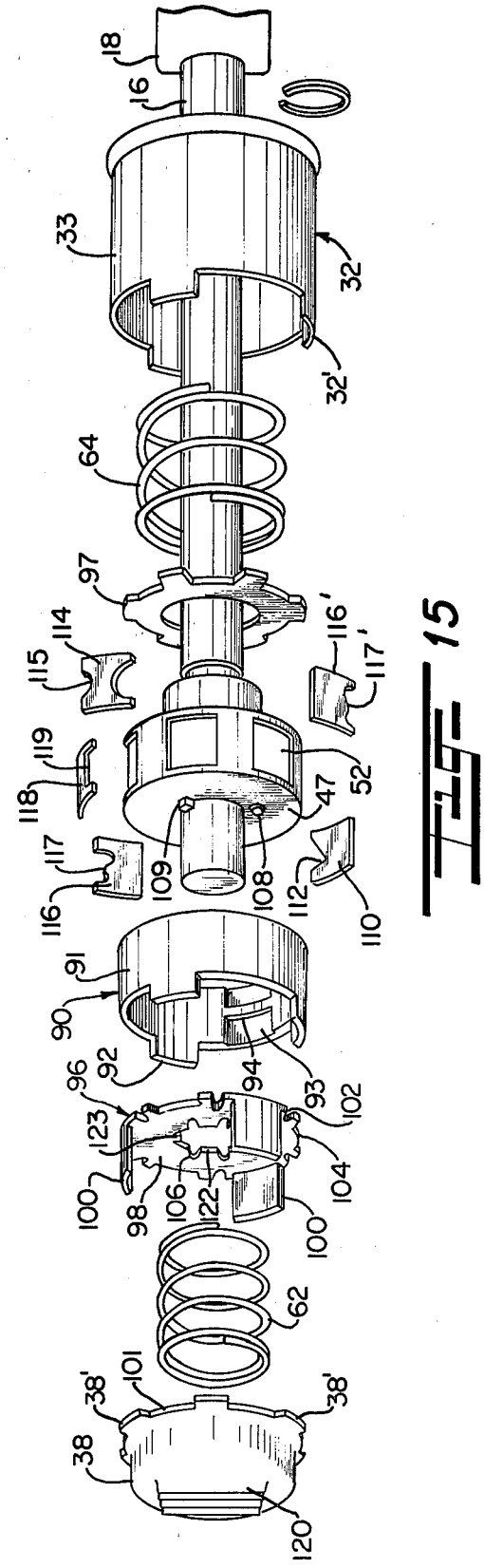

FORCE-RESPONSIVE SHOCK ABSORBING APPARATUS

This invention relates to novel and improved shock absorbing apparatus particularly of the type which is capable of dampening the movement of a piston automatically in response to changes in hydraulic forces applied to the piston.

BACKGROUND AND FIELD OF THE INVENTION

Although the present invention has useful application to numerous industrial and commercial uses, its principles may be best exemplified by reference to its use as shock absorber for automotive vehicles and its ability to dampen forces of substantial magnitude applied to the suspension components of a vehicle.

I have previously devised a shock absorbing system in which a piston member is axially movable in an enclosed cylinder, and a slide member is disposed in the piston member and adapted to be movable across one or more bypass openings or orifices in response to changes in fluid pressure so as to regulate the bypass or flow of fluid from one side of the piston to the other in absorbing forces and dampening vibrations applied to the piston. Here, reference is made to my prior U.S. Pat. No. 3,896,908 for SHOCK ABSORBING APPARATUS. As disclosed therein, the slide member within the piston is disposed in an internal chamber and is normally disposed in predetermined relation to the bypass orifices. The internal chamber of the piston is in fluid communication with the fluid in the cylinder so that movement of the piston will exert increased pressure on the fluid at one end of the cylinder causing it to flow into the internal chamber of the piston and exert a pressure against one side of the slide member. The bypass orifices are positioned along the inner wall of the internal chamber and have selectively variable cross-sectional opening sizes and configurations to determine the degree of pressure resistance to movement of the piston irrespective of the speed of movement of the piston. This was found to achieve substantial advances in the present art of shock absorbers where fixed size orifices are primarily responsive to piston velocity or speed. In further explanation of the prior art employing fixed size orifices, it is acknowledged that fluid flow through a fixed orifice size results in an exponential curve. Thus, there is a disproportionately low pressure-to-flow relationship at low velocities and a disproportionately high pressure-to-flow relationship at high velocities. Shock absorbers employing a fixed size piston orifice, or a multiplicity of open and closed orifices, also employ relief or blow-off valves in the base of the pressure cylinder and at the piston. These blow-off valves, to prevent high pressure damage to the device, also have fixed size orifices. Again recognizing the exponential curve of a fixed orifice, the blow-off valve is set at a low limit effectively limiting the overall pressure and dampening capability of the device. Without a blow-off valve the conventional shock absorber would destruct under severe impacts, such as, those resulting from chuck holes or severe jolts. The further demand for a low limit setting and maximum flow is realized in considering the effect of low temperature and increased fluid viscosity.

The fluttering pressure responses and abrupt pressure peaks resulting from the opening and closing of the blow-off valves contribute to shock absorber noises, fluid cavitation and foaming, increased parts damage and wear both of the shock absorber and suspension components. Additionally, the functional limitation of the shock absorber limits suspension and vehicular control. Recognizing that fixed size orifices produce exponential curves explains the degree of compromise and limitation imposed when the end product either requires a linear response, a directly proportionate response, or a variable pressure speed response that must pass both above and below the linear curve.

In accordance with the teachings of my hereinbefore referred to patent, a predetermined force-speed performance curve can be achieved by the advancement of a slide member across a shaped orifice in response to pressure wherein the slide member is biased to oppose the fluid force within a piston housing. With the preferred laminar fluid flow and the chosen depth of the orifice remaining constant, a predetermined pressure drop across the orifice, in response to the application of a given force on the sliding member, is a direct result of the orifice width adjacent to the sliding member. While the principles of that invention still hold true, it is highly desirable to devise a shock absorber in which predetermined force-speed characteristics can be established via the selection of controlled orifice-sized shapes working in cooperation with an axial slide member which is extremely simplified in construction, employs a minimum number of parts, is operable over the widest possible speed and force ranges and permits ready interchangeability of orifice sizes while maintaining the closest possible control over its performance.

SUMMARY OF THE INVENTION

It is therefore a principal object and feature of the present invention to provide for a novel and improved pressure responsive shock absorber apparatus in which a predetermined relationship between fluid pressure to piston speed can be established while greatly simplifying the apparatus and minimizing the number and size of parts employed.

A related feature of the present invention resides in the ability to interchange bypass orifices or passageways of variable width or cross-sectional configuration to establish a predetermined force-speed characteristic and specifically wherein the displacement of fluid through the bypass orifices can be made proportional or can be made to vary disproportionately to the product of the mass and squared velocity of the suspension components attached to the device.

Another object and feature of the present invention is to provide apparatus conformable for use in various energy absorbing control applications, such as, shock absorbers, vibration damping and the like, a single control element being capable of establishing the desired force-speed characteristics for each specific or intended application; and further wherein a predetermined imposed pressure can establish a resistance and related or resultant speed of movement of a piston through a fluid-filled cylinder by regulating the effective flow area through one or more orifices in a novel and improved manner.

A further object of the present invention is to enable a shock absorbing or dampening device to automatically compensate for fluid viscosity, changes and parts wear while maintaining relatively the same force speed curve within a reasonable tolerance of needed performance.

A still further object of the present invention is to provide smooth changes in force speed relationships and higher pressure performance maximums before opening the safety orifice valve; and wherein it is possible to provide disproportionate or high levels of head start dampening even with relatively low imposed pressures or speed.

In accordance with the present invention, a shock absorbing apparatus has a cylinder provided with end walls at opposite ends thereof and a fluid reservoir communicates with the cylinder. A piston rod is slidable axially through one end of the wall of the cylinder having a piston head at one end of the piston rod within the cylinder, the piston head including an external, generally cylindrical surface in inner spaced concentric relation to the cylinder wall with fluid bypass means in the surface which define recesses of predetermined cross-sectional configurations and sizes. Tubular housing means is interposed concentrically between the cylindrical surface of the piston head and the cylinder and is operative to isolate the piston head from the interior of the cylinder except for an inlet orifice at one end and an outlet orifice at the opposite end for entry and discharge of fluid, respectively, into and from the interior of said tubular housing means.

Slide valve means are interposed concentrically between said external cylindrical surface and said tubular housing, and retainer means on opposite sides of the slide valve means normally retains the slide valve means over the fluid bypass means, the increase in force of the fluid acting on one end of the piston head in response to relative movement between the cylinder and piston head inducing a change in position of the slide valve means with respect to the fluid bypass means whereby by slide valve means is slidable to modifying the opening size of the fluid bypass means for fluid flow therethrough in a direction to counterbalance the increase in fluid force while damping the relative movement between the tubular housing means and the piston head.

In a preferred form of invention, the bypass openings are formed in the external surface of the enlarged cylindrical end of the piston and slide valve means is positioned over the bypass openings by means of generally cup-shaped spring-loaded retainer elements on opposite sides of the slide valve means. In one modified form, the slide valve traverses the entire length of the external surface containing the bypass openings with an internal projection slidable along the bypass openings to regulate the fluid flow, and spring-loaded retainers are placed at opposite ends of the external surface to position the slide valve in predetermined relation to the bypass openings. In another modification, the bypass openings are indented into the external cylindrical surface on the end of the piston head at circumferentially spaced intervals, and individual slide valve members are positioned for sliding movement within each indentation while being prepositioned by spring-loaded retainer plates at opposite ends of the external surface. In an alternate form to the last discussed form of invention, a modified type of slide valve is incorporated into the spring-loaded retainer plates so as to form unitary elements working in cooperation with the bypass openings to regulate the passage of fluid therethrough.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a perspective view with portions broken away of the preferred embodiment of the present invention in an automotive shock absorber application;

FIG. 2 is an enlarged longitudinal section of the shock absorber illustrated in FIG. 1;

FIG. 3 is an exploded view of the piston assembly of the preferred form of present invention;

FIGS. 4, 5 and 6 are corresponding sectional views of the preferred embodiment of the present invention and illustrating the movement of the slide member across the shaped orifices between forward and rearward limits of travel;

FIG. 7 is an exploded view of a modified form of piston head assembly in accordance with the present invention;

FIGS. 8, 9 and 10 are cross-sectional views of the modified form of piston head assembly shown in FIG. 7 and illustrating the forward, intermediate and rearward disposition of the slide member with respect to the shaped orifices, respectively;

FIG. 11 is exploded view of another modified form of the present invention;

FIGS. 12, 13 and 14 are cross-sectional views of the piston head assembly shown in FIG. 11 and illustrating the travel of the slide member relative to the shaped orifices between a forward, intermediate and rearward position of travel, respectively;

FIG. 15 is an exploded view of still another modified form of the present invention; and FIGS. 16, 17 and 18 are cross-sectional views of the modified form shown in FIG. 15 and illustrating the travel of the slide member between forward and rearward end limits with respect to shaped orifices.

DETAILED DESCRIPTION OF THE PREFERRED EMBODIMENT

Referring in more detail to the drawings, there is shown by way of illustrative example in FIGS. 1 and 2 a shock absorbing apparatus 10 which is broadly comprised of an exterior tube or cylinder 12 provided with end caps 13 and 14, an end connector stem 15 projecting from the end cap 13 at one end of the cylinder, and the opposite end cap 14 provided with an axial passage to permit slidable movement of a piston rod 16 therethrough. Piston rod 16 is provided with a loop end connector 18 which is adapted to be attached to a fixed component of an automotive vehicle, such as, for instance, the frame while the end connector 15 is adapted to be affixed to a moving component, such as, the lower control arm. Internally of the end cap 14, a gland or seal 20 is arranged in surrounding relation to the piston rod 16, and the piston rod is centered for movement through the end cap by means of transversely extending rod guide in the form of an end bracket 21. The inner end of the piston terminates in a piston head assembly 22 which, in accordance with the present invention, is disposed for slidable movement through a high pressure tube 24, the latter being disposed in inner spaced concentric relation to the cylinder 12 and mounted in fixed relation to the cylinder between the end bracket 21 and a valve 28 which is seated against an outwardly flared end wall 26 of the end cap 13. The spaced concentric relationship established between the high pressure tube 24 and cylinder 12 forms an annular space or reservoir 27 for retention of a working fluid, such as, a hydraulic fluid, and the valve 28 at one end of the high pressure tube 24 permits selective communication and flow of fluid between the reservoir 27 and interior of the tube 24. The piston 22 is disposed within the high pressure tube 24 so as to effectively divide the tube into axially spaced chambers or compartments 30 and 31, respectively, with the chamber 30 at one end in communication with the reservoir 27. During the compression stroke, with the piston moving from right to left, fluid flows from the high pressure chamber 30 through restricted passageway 28a to allow for the displacement of fluids caused by rod 16 entering the high pressure compartment 31. During the extension stroke, with the piston moving from left to right, the reduction in pressure in the compartment 30 is sufficient to contract the valve ring 28b to allow maximum flow from reservoir 27 through passageway 28c to chamber 30. To this end, the valve ring 28b is split with its split ends in closely-spaced relation to opposite sides of a boss 25 which intrudes from the valve 28 between the split ends in order to limit the amount of contraction of the ring 28b. The contraction of the valve ring 28b is shown dotted in FIG. 2.

In the form of invention shown in FIGS. 1 and 2, the piston head assembly 22 is broadly comprised of a generally cup-shaped piston body 32 having an external cylindrical wall 33 and an end wall 34 which is affixed to a reduced end 35 of the inner end of the piston rod 16 by a snap ring 36. The cylindrical sidewall 33 is dimensioned to be spaced in inner concentric relation to the tube along its greater length but diverges outwardly at its juncture with the end wall 34 into an increased diameter portion 37 which is slidable in substantially sealed relation along the inner wall surface of the high pressure tube 24. The end of the wall 33 opposite to the end wall 34 is substantially closed by a piston cap 38, the cap 38 provided with circumferentially spaced, outwardly directed tabs 39 for interengagement with radially inwardly directed tabs 40 at the end of the cylinder wall 33 so as to permanently affix the end cap 38 to the piston body 32. In order to permit fluid flow through the piston head assembly internally of the piston body, end cap 38 is provided with a series of circumferentially spaced openings 42, and openings 44 of limited size are similarly formed at circumferentially spaced intervals in the end wall 34.

The construction and arrangement of the piston core 46 within the piston head 22 can be best understood by reference to FIG. 2 along with FIGS. 3 to 6. The piston core 46 is of solid cylindrical construction having an enlarged cylindrical block 47 disposed intermediately between an axially extending portion 48 which extends toward the end wall 34 and an axially extending portion 50 which is disposed against the end cap 38. The portion 48 is of reduced diameter with respect to the body 47 but of larger diameter than the portion 50 and has a counterbore 51 to receive the reduced end of the piston rod 16 with outer surrounding wall portion 48 bearing against the end wall 34. In turn, the portion 50 is of reduced diameter with respect to portion 48 and has its distal end firmly seated against the inner surface of the end cap 38 so that the entire piston core is fixed with respect to the piston body 32. The external surface of the piston block 47 is provided with one or more recesses 52 which are of generally rectangular configuration and form shallow depressions or cavities for pressfit insertion of valve plate 55. Each valve plate 55 has an orifice or cut-out area 56 of predetermined configuration extending lengthwise of one axially directed edge of the valve plate, the width of which varies along its length to establish the effective flow area of the orifice for the bypass of fluid under pressure from one side of the piston body to the other.

In the preferred form shown in FIGS. 1 to 6, it will be seen that the valve plate 55 when inserted into each recess 52 forms an orifice whose cross-sectional width varies along its length so that as, viewed from left to right in FIGS. 4 to 6, the cross-sectional size of the orifice will increase as at A followed by a decrease or reduction in cross-sectional width as at B, then diverge or increase in width as at C. The variation in width of the orifice is determined according to the force-speed performance curve or specifications for the particular shock absorber. The effective flow area through the bypass orifice is controlled by a slide valve member in the form of a ring 58 which is interposed for slidable movement between the external wall of the piston block 47 and the inner wall of the piston body 32. The ring 58 is of rectangular or square cross-section, and its positional relationship to the orifice is initially established by sandwiching the ring 55 between generally cup-shaped spring seats 60 and 61 which are disposed in facing relation to one another on opposite sides of the piston block 47. The spring seat 60 is biased into engagement with one side of the valve 58 by compression spring 62 which is mounted under compression between the end cap 38 and the radially extending face 63 of the spring seat 60. The spring seat 61 is similarly spring-loaded against the opposite side of the valve 58 by compression spring 64 which is mounted under compression between the end wall 34 and radial wall 65 of the spring seat 61. In the present invention, there is no requirement for a balanced relationship between the spring pressures to locate the sliding ring 58 at the static point and changing a force-speed resistance curve may only entail changing one part. As depicted in FIGS. 2, 3 and 5, the location of the sliding valve ring 58 when at static, or at its start position, is determined by the depths of the recycled portions of spring seats 60 and 61 and not by a balancing or equalizing of the spring pressures of springs 62 and 64. Moreover, springs 62 and 64, their rates and characteristics, are unrelated during any dynamic axial movement of ring 58.

An automotive shock absorber often requires a considerably higher resistance range and curve during the extension stroke than during the compression stroke. Viewing FIG. 1, the compression stroke occurs when the piston head 22 moves leftward causing a response of the piston internal parts as shown in FIG. 6. The extension stroke occurs when piston 22 moves rightward causing a response of the piston internal parts as shown in FIG. 4. The fluid pressure drop across piston body 22 causing ring 58 to slide axially becomes equalized by an opposing spring pressure to specifically locate ring 58 to orifice sectional passageways adjacent to the ring. The force of the springs 62 and 64 at any given compressed length is readily determined as the product of the spring rate and the length of compression from free length. For the purpose of illustrating the invention, coil springs which have a constant spring rate are utilized. The area of ring 58 exposed to fluid pressure represents a small fraction of the piston face area exposed to fluid pressure, thus the spring operating ranges will be the same fraction of the total force range or pressure drop across the piston. Using a relatively small area ring 58 with correspondingly smaller biasing means 62 and 64 results in a surplus of envelope spaces 22A and 22B available for the biasing means, enabling the device to be designed to function over a wide selection of pressure ranges as well as a wide variance in resistance pressure ranges of the compression and extension strokes. Referring to a typical automotive requirement, FIGS. 2 through 5 show spring 62 to be of higher spring rate than spring 64, although many other spring proportions and options are readily applicable within the various embodiments described within this invention.

In order to permit fluid flow past each of the spring seats 60 and 61 and through the orifices established between the slide valve 58 and valve plate 55, the surrounding rim of each spring seat 60 and 61 is provided with openings or slots in communication with the orifices. In the preferred form, this is accomplished by forming a series of castellations 66 along the rim of each spring seat 60 and 61 at its point or line of engagement with either side of the ring valve 58; and, according to the direction of movement of the piston head assembly through the cylinder, the differential pressure between opposite sides of the piston head will be effective to overcome the spring force and cause advancement of the slide valve 58 along the surface of the piston block 47. This is illustrated in FIGS. 4 to 6 where, in response to movement in a rearward direction through the cylinder, a differential pressure is created which will cause increased pressure to act against the slide valve 58 causing it to advance forwardly along the surface of the piston block 47, thereby compressing spring 62, until the pressures on opposite sides of the piston head 22 is balanced or nulled, at which time the spring seat 60 will return the slide valve 58 to the intermediate or static position shown in FIG. 5. Conversely, forward advancement of the piston head assembly 22 through the cylinder is resisted by fluid pressure acting against the opposite side of the slide valve 58 overcoming the force of the spring 64 and causing movement of the slide valve from the intermediate position B toward the rearwardmost position C.

In the modified form of invention shown in FIGS. 7 to 10, like parts are correspondingly enumerated to that of FIGS. 3 to 6. In the modified form, a slide valve 68 is disposed over the valve plates 55 as illustrated in the preferred form, but the slide valve 68 is comprised of an annular band 69 of a width corresponding to the width of the piston block 47, the band 69 having an inwardly projecting flange 70 which serves as a valve or wiper element across the bypass orifices formed in the valve plate 55. In this version, since the slide valve 68 occupies a position superimposed upon the piston block 47, the spring seats are defined by annular plates 72 and 73 at opposite ends of the valve block, each valve plate provided with circumferentially spaced teeth 74 which leave gaps or openings 75 in communication with the bypass opening or orifice 56 in the valve plate. As in the preferred form, compression springs 62 and 64 are yieldingly urged against the spring seats 72 and 73 so as to be overcome by fluid pressure in either direction of flow through the piston head assembly. Thus, according to differential fluid pressure established, the fluid flow will act against one side of the valve 68 overcoming the force of the spring acting in the opposite direction against the valve so as to cause advancement of the valve in either direction between the forwardmost and rearwardmost positions as illustrated in FIGS. 8 to 10, and to effectuate controlled leakage of fluid flow through the bypass orifices 56.

In the modified form of invention shown in FIGS. 11 through 14, again like parts are correspondingly enumerated. In this form, the valve block 47 is modified by the formation of indented passageways or slots 76 which extend axially along the cylindrical surface of the block in diametrically opposed relation to one another. A generally keyhole shaped bypass orifice 78 is formed in the inner surface or bottom of the slot 76. A slide valve 80 in the form of an arcuate plate 81 having a radially inwardly projecting bar or flange 82 of generally rectangular cross-section is disposed for slidable movement through each slot 76, the length of the flange 82 corresponding to the width of the slot 76. The valves 80 are retained in axial position over the bypass orifices 78 by spring seats 72 and 73 which again are disposed in confronting relation to one another, the spring seats 72 and 73 corresponding to those illustrated in FIGS. 7 to 10 and spring-loaded in the same manner by springs 62 and 64.

The configuration of each bypass orifice 78 will again be dictated by the force performance curve desired for the particular shock absorber and will be given a configuration such that it may for example have a reduced cross-sectional area A at its forwardmost end extending into an increased cross-sectional area B toward its rearwardmost end so as to change the cross-sectional flow opening as the slide valves 80 are advanced toward the forwardmost position shown in FIG. 12 and the rearwardmost position shown in FIG. 14.

FIGS. 15 through 18 serve to illustrate a form of construction whereby any one of a number of passageways may be selected and aligned with a single sliding bridge valve 94 shutting off all others from fluid communication. This form of invention further illustrates modifications both with respect to the configuration of the bypass orifices according to a specific performance curve and the mounting and disposition of a slide valve with respect to a spring seat so as to fix the slide valve against rotational displacement with respect to the spring retainer 96, piston cap 38 and piston body 32. A plurality of valve plates 110, 114, 116, 116' and 118 are arranged in circumferentially spaced relation to one another and positioned in rectangular openings 52 in the wall of the piston block 47. Various different configurations of bypass orifices are illustrated, again according to a specific force performance curve and these will be described hereinafter in greater detail. Slide valve 90 is in the form of an annular band 91 whose width corresponds to the width of the piston block 47 and has forwardly directed teeth 92. Here a series of three forwardly directed teeth 92 are illustrated at equally spaced intervals around the end of the band 91. The forwardly projecting teeth 92 are slidable through correspondingly spaced notches 104 in spring seat 98, and the slide valve 90 is axially slidable in relation to spring seat 98. A recessed inner wall 93 is formed in the band 91 with a circumferentially extending bridge 94 at an intermediate portion thereof. Circumferentially spaced notches 102 provide fluid communication therethrough into recess 93, and through a selected orifice or passageway aligned with the bridge 94, when the slide valve 90 is forced away from spring seat 98 during the compression stroke. In order to encapsulate all of the internal components of the piston, the piston body 33 has projecting tabs 32' which extend through notches 101 in the piston cap 38 and compressively retain cap 38 by bending the tabs 32' radially inwardly against piston cap 38.

Spring seat 98 is axially slidable in relation to piston cap 38, and each of the parts 38, 90 and 98 is locked against rotation independently of each other. Likewise, valve block 47 and rod 16 are fixed together as one piece as are plates 110, 114, 116, 116′ and 118 fixed in rotatable relation to the piston block 47 and rod 16. Projecting boss 109 is fixed to the piston block 47, and the spring-loaded ball snap 108 is radially located to engage and intercept one of the notches 106 of the flange face of spring retainer 98. The radius from the centerline axis to circumferential face 122 of spring seat 98 is greater than the radius from the axis to the exterior radially outwardly projected face of boss 109. The radially inwardly projecting tooth 123 of spring seat 98 projects inwardly from radial face 122 and is made to intersect and abut boss 109 limiting the rotation of piston block 47 in relation to spring seat 98 to slightly less than 360°.

In order to select a particular valve plate and precisely locate it over the sliding bridge 94, the shock absorber is totally compressed plunging the piston head 22 inwardly to cause a pair of rectangular tabs 120 on the piston head 22 to engage a complementary key 11 projecting from the inside of end cap 13. When the piston cap 38 is so engaged, the piston body 32, piston cap 38, spring seat 98 and sliding valve 90 are locked and non-rotatable within the shock absorber device, but the assembly including the piston block 47, with inserted plates 110, 114, 116, 116′ and 118, along with boss 109, ball snap 108, rod 16 and loop end 18 are all locked and rotatable together within the device. With the end cap 38 engaged and locked as described, rotation of rod 16 will in turn rotate the piston block 47 and cause the valve plates to rotate within the non-rotating sliding valve 90. The ball snap 108 can be felt to snap from one slot 106 to another each time specifically aligning bridge 94 under a particular valve plate. Starting with the counterclockwise abutment of tooth 123 against boss 109, under clockwise rotation it becomes possible to select and stop at any one of the valve plates 55 signaled by the ball snap during clockwise rotation.

It should be emphasized that FIG. 15 illustrates various different bypass orifices intended for interchangeable or optional use in accordance with different force performance curves. Considering the configuration of the bypass openings, it will be seen that one of the valve plates 110 is provided with a generally triangular shaped opening 112 which diverges then converges in a rearward direction along its length. Another valve plate 114 includes generally semi-circular shaped openings 115 on opposite sides; and another valve plate 116 has an orifice 117 of a configuration corresponding to that illustrated in FIGS. 1 to 6. Finally, valve plate 116′ has an orifice shape 117′ similar to but shallower than orifice 117, and valve plate 118 has a generally rectangular orifice 119. Again the specific configuration of the bypass orifice is dictated by the force performance curve and may vary both in configuration and size according to the rate of flow of fluid desired as the slide valve is advanced therealong in response to a differential pressure created on opposite sides of the assembly.

A number of advantages accrue from utilization of variable width bypass orifices located externally of the piston head as described. In the preferred and modified forms of invention, location of the bypass orifices on the external surface of the piston block 47 facilitates ready interchangeability of the valve plates so that the cross-sectional width of the orifices will vary along their length according to the desired force/performance curve. As a result, the characteristics of the shock absorber are such that each is primarily and totally responsive to the pressure imposed upon the piston head and the actual piston velocity being a result, not a cause, of the pressure development. Thus, unlike fixed size orifices customarily employed, the variable shaped orifices or passageways will enable the piston to move at a velocity disproportionate to the pressure imposed. This can be seen from a consideration of the graph illustrated in my hereinbefore referred to patent, FIG. 16 which is a plot of total pressure vs. piston speed or velocity. The position of the curve on the graph is determinable by controlling the leakage past the piston and by enlarging or decreasing the cross-sectional width across the orifices without modifying their depth. In this way, the shock absorber is responsive to the total force across the face of the piston head, as opposed to velocity alone. In other words, a large mass at low velocity may impart the same pressure to the piston head as a small mass at a high velocity.

The construction and principle of the preferred and alternate forms of the present invention have a number of applications other than automotive shock absorbing devices. For instance, it is readily comformable for use in controlling the flap or rudder of an airfoil where the flaps are extended or retracted to increase or decrease lift vs. speed while dampening frequencies which may otherwise fatigue the components and associated linkage. The same is true of machine tools, railroad rolling stock as well as linear couplings, vibration and thrust control devices of ships and boats. Other illustrations can be found in elevator and hoist control or dampening devices as well as innumerable pneumatic and hydraulic applications. Further, its use as a variable metering device in fluid flow applications will be readily perceived.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. A fluid vibration damper having a fluid-filled cylinder provided with end walls at opposite ends thereof, a fluid reservoir in communication with said cylinder, a piston rod slidable axially through one end wall of said cylinder having a piston head at one end of said piston rod being disposed within said cylinder, said piston head including a generally cylindrical external surface portion in inner spaced concentric relation to said cylinder and provided with fluid bypass means of a preselected size and configuration, tubular housing means interposed concentrically between the cylindrical surface of said piston head and said cylinder and being operative to isolate said piston head from fluid communication with the interior of said cylinder except for flow passages at opposite ends for entry and discharge of fluid into and from the interior of said tubular housing means, slide valve means interposed concentrically between said external cylindrical surface and said tubular housing means, and retainer means on opposite sides of said slide valve means normally retaining said slide valve means over said fluid bypass means, the increase in force of the fluid acting at one end of said piston head in response to relative movement between said cylinder and said piston head inducing a change in position of said slide valve means with respect to said fluid bypass means whereby said slide valve means is slidable to modify the opening size of said fluid bypass means for fluid flow therethrough in a direction to counterbalance the increase in fluid force while damping the relative movement between said tubular housing means and said piston head.

2. A fluid vibration damper according to claim 1, wherein said retainer means is operative to normally center said slide valve means in relation to said fluid bypass means.

3. A fluid vibration damper according to claim 2, wherein the circumferential opening size of said fluid bypass means determines the rate of fluid flow therethrough when said slide valve means is advanced away from its normally centered relation to said bypass openings in response to an increase in force at one end of said piston head.

4. A fluid vibration damper according to claim 1, said fluid bypass means defined by a plurality of openings at circumferential intervals around said external surface portion, said openings varying in width in the direction of movement of said slide valve means to establish a predetermined variation in the mass rate of flow of fluid therethrough in response to changes in the force of fluid acting at one end of said piston head.

5. A fluid vibration damper according to claim 1, said retainer means being spring-loaded to cooperate in damping minor excursions of said piston head.

6. A fluid vibration damper according to claim 1, said fluid bypass means including a valve plate insertable in said external surface portion, said valve plate containing a bypass orifice.

7. A fluid vibration damper according to claim 6, said valve plate being releasably inserted in said external surface portion.

8. A fluid vibration damper according to claim 7, said valve plate being of generally rectangular configuration and insertable in flush relation to said external surface portion.

9. A fluid vibration damper according to claim 8, there being a plurality of said bypass orifices in spaced circumferential relation along said external surface portion.

10. A fluid vibration damper according to claim 1, said fluid bypass means formed in the bottom of a slot in said external surface portion, said slide valve being in the form of an arcuate bar of a length corresponding to the circumferential dimension of said slot.

11. A fluid vibration damper according to claim 1, said slide valve means defined by an annular band of a width corresponding to the width of said external surface portions and having a radially inwardly directed flange in outer concentric relation to said external surface portion and slidable in sealed relation to said external surface portion.

12. In a shock absorber having a fluid-filled cylinder, a piston head assembly at one end of a piston rod slidable through said cylinder, said piston head assembly dividing said cylinder into compartments at opposite ends of said piston head, and fluid pressure release means in communication with each of said compartments, the improvement comprising:

said piston head assembly including a tubular outer housing in substantially sealed relation to an inner wall of said cylinder and in fluid communication with said compartments at opposite ends of said cylinder, a piston body within said tubular housing defining an axial extension of said piston rod and having an external cylindrical wall in closely-spaced, inner concentric relation to the wall of said tubular housing, a plurality of spaced bypass orifices in said external cylindrical wall, said orifices each having a predetermined width which varies in a direction axially of said piston head assembly, slide valve means interposed in sealed relation between said inner wall of said tubular housing and said external cylindrical wall being of a width less than the length of said orifices, said slide valve means slidable in an axial direction to regulate the effective width of said orifices for fluid flow therethrough from one compartment to the other in response to changes in the differential pressure of the fluid acting at opposite ends of said piston head, and slide valve retainer means operative to limit the movement of said slide valve means along said external cylindrical wall.

13. In a shock absorber according to claim 12, said slide valve retainer means defined by spring-loaded retainer members engageable with opposite sides of said slide valve means.

14. In a shock absorber according to claim 12, valve plates containing said bypass orifices inserted in said external cylindrical wall.

15. In a shock absorber according to claim 14, said valve plates being releasably inserted in said external cylindrical wall.

16. In a shock absorber according to claim 15, said valve plates inserted in slots of generally rectangular configuration in said external cylindrical wall, and a bypass orifice formed in each of said valve plates.

17. In a shock absorber according to claim 12, there being a plurality of said bypass orifices disposed in spaced circumferential relation along said external cylindrical wall.

18. In a shock absorber according to claim 12, each of said bypass orifices having a different width which varies in a direction axially of said piston head assembly, said slide valve means being alignable with a selected orifice for fluid flow only through that orifice, and releasable locking means associated with said piston head assembly for selectively aligning said slide valve means with a selected one of said orifices.

19. In a shock absorber according to claim 18, said slide valve means defined by an annular band having a radially inwardly directed circumferentially extending flange in outer concentric relation to said external cylindrical wall, and said retainer means being spring-loaded to be yieldingly urged against opposite sides of said slide valve means.

20. A shock absorbing apparatus comprising:
a fluid-filled cylinder provided with end walls at opposite ends thereof and an inner concentric tube defining a fluid reservoir along the inner wall of said cylinder, a piston rod slidable axially through one end wall of said cylinder having a piston head at one end of said piston rod disposed within said cylinder, said piston head including an enlarged, generally cylindrical external surface portion provided with fluid bypass openings of a preselected size and configuration therein, housing means in the form of a hollow cylinder interposed concentrically between the external surface portion of said piston head and said tube and being operative to isolate said piston head from the interior of said cylinder except for inlet and outlet ports at opposite ends for entry and discharge of fluid into and from the interior of said tubular housing means, slide valve means interposed concentrically between said external surface portion on said tubular housing means and in surface contact with said external surface, and spring-loaded retainer means on opposite sides of said slide valve means normally retaining said slide valve means over said orifices, the cross-sectional width of said fluid bypass openings varying in an axial direction along said external surface portion whereby said slide valve means is slidable to vary the effective opening size of said fluid bypass openings for fluid flow therethrough in a direction and at a rate to counterbalance changes in differential fluid pressure at opposite ends of said piston head induced by the relative movement between said tubular member and said piston head.

21. A shock absorbing apparatus according to claim 20, wherein the circumferential opening size of said fluid bypass openings determines the mass rate of fluid flow therethrough when said slide valve means is advanced across said fluid bypass openings.

22. A shock absorbing apparatus according to claim 20, said slide valve means being of a width less than the axial dimension of said fluid bypass openings.

23. A shock absorbing apparatus according to claim 22, including valve plates, each containing a fluid bypass opening, interchangeably positioned in slots in said external surface portion.

* * * * *